United States Patent
Gelb et al.

(10) Patent No.: US 10,269,136 B2
(45) Date of Patent: Apr. 23, 2019

(54) SYSTEM AND METHOD FOR PROCESSING DEPTH IMAGES WHICH CAPTURE AN INTERACTION OF AN OBJECT RELATIVE TO AN INTERACTION PLANE

(71) Applicant: HEWLETT-PACKARD DEVELOPMENT COMPANY, L.P., Houston, TX (US)

(72) Inventors: Daniel George Gelb, Palo Alto, CA (US); Kar-Han Tan, Palo Alto, CA (US); Claudio Rosito Jung, Porto Alegre (BR); Henrique Weber, Porto Alegre (BR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 15/542,882

(22) PCT Filed: Apr. 29, 2015

(86) PCT No.: PCT/US2015/028346
§ 371 (c)(1),
(2) Date: Jul. 11, 2017

(87) PCT Pub. No.: WO2016/175801
PCT Pub. Date: Nov. 3, 2016

(65) Prior Publication Data
US 2018/0047182 A1  Feb. 15, 2018

(51) Int. Cl.
*G06T 7/73* (2017.01)
*G06T 7/77* (2017.01)
(Continued)

(52) U.S. Cl.
CPC ............... *G06T 7/73* (2017.01); *G06F 3/011* (2013.01); *G06F 3/017* (2013.01); *G06F 3/0304* (2013.01); *G06F 3/0425* (2013.01); *G06T 7/11* (2017.01); *G06T 7/155* (2017.01); *G06T 7/194* (2017.01); *G06T 7/215* (2017.01); *G06T 7/77* (2017.01);
(Continued)

(58) Field of Classification Search
CPC ... G06T 7/73; G06T 7/194; G06T 7/11; G06T 7/155; G06T 7/77; G06T 7/215; G06T 19/00; G06T 2207/10024; G06T 2207/20076; G06T 2207/20152; G06T 2207/20004; G06T 2207/10028; G06T 2207/10016; G06T 2210/21;
(Continued)

(56) References Cited

U.S. PATENT DOCUMENTS 5,710,830 A  1/1998 Holeva
8,072,470 B2  12/2011 Marks
(Continued)

OTHER PUBLICATIONS

Sven Olufs et al: "Towards efficient semantic real time mapping of man-made environments using Microsoft's Kinect", Robotics and Biomimetics, IEEE International Conference on, IEEE, Dec. 7, 2011, pp. 130-137.
(Continued)

*Primary Examiner* — Ming Y Hon
(74) *Attorney, Agent, or Firm* — HPI Patent Department

(57) ABSTRACT

In some examples, a computing device processes depth images to capture an interaction of an object relative to an interaction plane.

20 Claims, 4 Drawing Sheets

(51) Int. Cl.
*G06T 19/00* (2011.01)
*G06F 3/01* (2006.01)
*G06F 3/03* (2006.01)
*G06T 7/11* (2017.01)
*G06F 3/042* (2006.01)
*G06T 7/155* (2017.01)
*G06T 7/215* (2017.01)
*G06T 7/194* (2017.01)

(52) U.S. Cl.
CPC .... *G06T 19/00* (2013.01); *G06T 2207/10016* (2013.01); *G06T 2207/10024* (2013.01); *G06T 2207/10028* (2013.01); *G06T 2207/20004* (2013.01); *G06T 2207/20076* (2013.01); *G06T 2207/20152* (2013.01); *G06T 2210/21* (2013.01)

(58) Field of Classification Search
CPC ... G06T 2210/02; G06F 3/017; G06F 3/0425; G06F 3/0304; G06F 3/011
See application file for complete search history.

(56) References Cited

U.S. PATENT DOCUMENTS

| | | | |
|---|---|---|---|
| 8,422,775 B2 | 4/2013 | Wang et al. | |
| 8,824,802 B2* | 9/2014 | Kutliroff | G06K 9/00201 348/143 |
| 2010/0086199 A1* | 4/2010 | Kim | G06T 17/20 382/154 |
| 2010/0302365 A1* | 12/2010 | Finocchio | G06K 9/00201 348/142 |
| 2011/0293137 A1 | 12/2011 | Gurman et al. | |
| 2011/0301934 A1* | 12/2011 | Tardif | G06F 3/017 704/1 |
| 2012/0092445 A1 | 4/2012 | McDowell et al. | |
| 2012/0212509 A1 | 8/2012 | Benko et al. | |
| 2012/0327125 A1* | 12/2012 | Kutliroff | G06F 3/017 345/660 |
| 2013/0016033 A1* | 1/2013 | Latta | G06F 3/011 345/8 |
| 2013/0155050 A1* | 6/2013 | Rastogi | G06T 5/50 345/419 |
| 2013/0156264 A1* | 6/2013 | Martensson | G06T 7/0075 382/103 |
| 2014/0104394 A1 | 4/2014 | Yanai et al. | |
| 2014/0354602 A1 | 12/2014 | He et al. | |
| 2015/0102997 A1 | 4/2015 | Yun et al. | |
| 2016/0100152 A1* | 4/2016 | Park | G06T 19/00 382/154 |

OTHER PUBLICATIONS

Gordon, G et al, "Background Estimation and Removal Based on Range and Color", Jun. 1999.
Prada, F et al, "improving Object Extraction with Depth-based Methods", Apr. 15, 2013.

* cited by examiner

SYSTEM AND METHOD FOR PROCESSING DEPTH IMAGES WHICH CAPTURE AN INTERACTION OF AN OBJECT RELATIVE TO AN INTERACTION PLANE

BACKGROUND

Human computer interfaces currently exist which use depth-based images as a mechanism for determining input. Some computer systems such as the SPROUT, manufactured by HEWLETT PACKARD COMPANY, utilize a depth-based camera in order to detect and analyze objects placed on a designated or associated surface.

DETAILED DESCRIPTION

Figure 1:
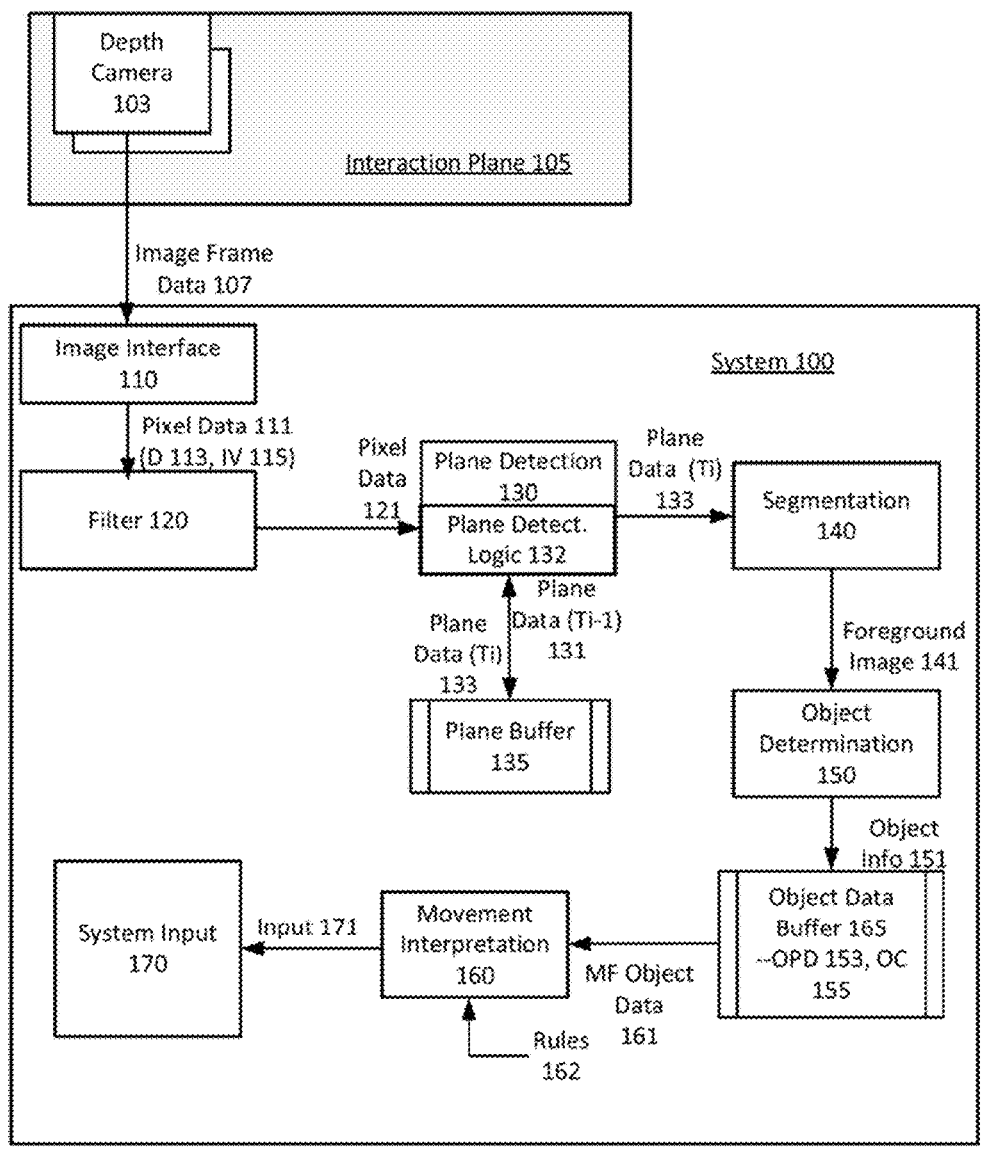
FIG. 1 illustrates an example system for processing depth images in connection with an interaction plane.

Examples described herein include a system and method for processing a series of depth images which capture an interaction of an object of interest (e.g., user hand) over or relative to an interaction plane. According to some aspects, a depth image processing system and method is described which can analyze and detect a movement of an object with respect to or over an interaction plane, including movement which results in the object making contact with or being in close proximity to the interaction plane. In contrast to some conventional approaches, the proximity of the object of interest with respect to the interaction plane does not hinder the ability of an associated computer system to interpret a gesture or movement of the object with respect to the interaction plane.

According to one aspect, an initial image in, a series of images is analyzed. For the initial image, (i) a plane approximation of pixels is determined which correspond to the interaction plane, and (ii) an object approximation of pixels is determined which correspond to the object. The plane approximation of pixels can be determined based at least in part on depth information carried by individual pixels of the initial image. The approximation of object pixels can be determined in one or more images which follow the initial image, based at least in part on the plane approximation of pixels of the initial image.

With regard to examples described, an "interaction plane" refers to a designated surface over which an object interaction can be imaged and interpreted through depth-image analysis. Many examples described can be implemented with computer systems which are provided or otherwise associated with a defined surface on which user interaction can be received. In such examples, an object of interaction (sometimes referred to as object of interest) can correspond to a user hand, or portion of a hand (e.g., finger) or arm, and the interaction plane marks a surface over which the user forms gestures or performs other movement actions in order to provide input. In contrast to conventional approaches, examples as described enable object detection with respect to the interaction plane when the object is close or on the interaction plane. This enables a more robust and diverse range of inputs and level of human interaction with the associated computer system. While numerous examples described herein provide for the object of interest to correspond to the user's hand, variations provide for a system in which alternative types of objects (e.g., styluses or pens, three-dimensional objects of various types, etc.) can be detected and separately recognized.

Examples described herein provide that methods, techniques, and actions performed by a computing device are performed programmatically, or as a computer-implemented method. Examples may be implemented as hardware, or a combination of hardware (e.g., a processor(s)) and executable instructions (e.g., stored on a machine-readable storage medium). These instructions can be stored in one or more memory resources of the computing device. A programmatically performed step may or may not be automatic.

Examples described herein can be implemented using programmatic modules or components. The programmatic modules or components may be any combination of hardware (e.g., processor(s)) and programming to implement the functionalities of the modules or components described herein. In examples described herein, such combinations of hardware and programming may be implemented in a number of different ways. For example, the programming for the components may be processor executable instructions stored on at least one non-transitory machine-readable storage medium and the hardware for the components may include at least one processing resource to execute those instructions. In such examples, the at least one machine-readable storage medium may storage instructions that, when executed by the at least one processing resource, implement the components.

Some examples described herein can generally involve the use of computing devices, including processing and memory resources. For example, examples described herein may be implemented, in whole or in part, on computing devices such as desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for processing depth images in connection with an interaction plane. In more detail, a depth image processing system 100 can operate in connection with an associated computer system (e.g., see FIG. 5) in order to detect and process an interaction as between an object of interest and a designated interaction plane 105. By way of example, system 100 can be implemented with, or as part of a computer system which processes gesture input provided relative to a designated surface that corresponds to the interaction plane 105. A user can, for example, make gestures with his hands and/or fingers, or perform other movements relative o the interaction plane 105, which individually or in combination with other movements, serve as input for controlling an application, process or other mechanism of the computer system. While examples described enable better detection and interpretation of gesture input, variations to examples described can include alternative usages and Purposes. By way of example, system 100 can be programmed to identify and/or segment objects that are placed on the interaction plane 105.

With reference to FIG. 1, the system 100 includes an image interface 110, a filter 120, a plane detection component 130, a segmentation component 140, an object determination component 150, a movement interpretation component 160, and a system input interface 170. The image interface 110 can communicate with one no more depth cameras 103, which can monitor a scene that includes the interaction plane 105. The interaction plane 105 can correspond to, for example, a region of a tabletop or surface that resides physically under and/or adjacent to the location of the cameras 103. In variations, the interaction plane 105 can correspond to a multi-sensor region, such as a touch surface provided optically in position with respect to the depth-cameras 103 in order to capture object interaction with the interaction plane 105. In operation, the image interface 110 can receive a series of image frames 107 from the depth cameras 103. For example, the image interface 110 can receive a video clip comprising multiple sequenced image frames 107 from each of the depth cameras 103. The image interface 110 can extract image pixel data 111 from each image frame 107, and individual pixels of the image frame 107 can include or be associated with depth data 113 and an image value 115. The image value 115 associated with each pixel can correspond to, for example, color (and/or chromacity) or other image based value.

In many applications, the image frame 107 can detect a hand or other object of interest interacting with the interaction plane 105. The pixel data 111 can be in the form of a pixel cloud, which spatially distributes the pixels based on the depth information relative to the interaction plane 105. While the pixel cloud may be able to sufficiently delineate an object of interest from the interaction plane 105 when the object of interest is a sufficient distance away from the interaction plane, an example of FIG. 1 recognizes that additional processing and logic is needed to decipher pixels which comprise the object of interest when the proximity of the object to the plane is within a threshold in which system error and noise can mask pixels of the object of interest from those of the interaction plane. In particular, an example of FIG. 1 recognizes that in many context and usage scenarios, the hand or other object of interest can be placed in contact with, or in close proximity to, the interaction plane 105, when a gesture or other desired input is being provided by the user. Accordingly, system 100 includes functionality and logic which is predicated on the possibility that the interaction between the object of interest and the interaction plane 105 can include the object of interest making contact with the interaction plane 105, or otherwise coming in sufficient proximity to the interaction plane such that discrimination of the object and the interaction plane becomes difficult (e.g., based on the measurement error of the depth camera 103). By way of example, the user can place a hand on the interaction plane 105, and/or make simulated button or key contact with the interaction plane. Depending on implementation, system 100 can determine (i) whether an object that is moved near or on to the interaction plane is the object of interest, (ii) whether the object of interest actually made contact with the interaction plane 105, and/or (iii) spatial characteristics of the object of interest in the particular image frame data 107.

According to one aspect, the filter 120 can implement one or more filtering processes to reduce the noise level of the pixel cloud. An example of FIG. 1 recognizes that reduction in noise level can be particularly useful when the object of interest is on or very near the interaction plane 105. Filtered pixel data 121 can be provided to the plane detection component 130.

The plane detection component 130 implements one or more processes to detect a plane from the filtered pixel data 121. The plane detection component 130 can include plane detection logic 132 to approximate the pixels of the interaction plane 105 from the image frame 107 that is currently under analysis. In one implementation, plane detection logic 132 implements an iterative process (e.g., such as provided by a Random Sample Consensus ("RANSAC") method) in which randomly selected pixels are analyzed for depth, and optionally image values (e.g., color) in order to converge on a sufficient number of pixels which define a plane within the image. The plane detection logic 132 can implement some assumptions about the location of the interaction plane 105 in the image frame 107, specifically that the interaction plane may have a homogeneous color and further that the interaction plane is depth-wise the furthest object in the image. The plane detection logic 132 can determine a plane equation to approximate those pixels of the image frame data which represent the interaction plane 105.

According to some aspects, the system 100 utilizes plane data 131 as between successive or sequential image frames 107 of a common object interaction (e.g., video clip) or session, in order to facilitate approximation of the those pixels which comprise the interaction plane 105 in any given image frame of the captured interaction. By way of example, the plane data 131 can correspond to a plane equation. In variations, the plane data can correspond to identification of some or all of the pixels which are deemed to be part of the interaction plane 105. In utilizing plane data 131 between successive or sequential image frames, the plane detection component 130 can operate on an assumption that the location of the interaction plane 105 is static with respect to a given sequence of image frames 107. Accordingly, for a given image frame 107, the plane detection component 130 can first check for plane data 131 from a prior relevant image frame 107 in determining the interaction plane 105 of the current image frame 107, where the prior relevant image frame 107 corresponds to (i) a prior image frame 107 (e.g., immediately prior) from a series of image frames of the same object interaction (e.g., video clip which captures a user gesture action), (ii) a prior image frame from a current session, or (iii) a prior image frame from a previous instance of time which is within a threshold time frame. Prior to implementing plane detection logic 132, the plane detection component 130 can check a plane buffer 135 for plane data 131 of the prior relevant image frame 107. If a plane was previously detected in a prior image frame 107 of the same sequence, then the corresponding plane data 131 is used in order to determine updated plane data 133. The current plane data 133 can be processed for refinement in regards to the current image frame 107. If no plane data from a prior relevant image frame is identified, then the plane detection logic 132 can be implemented to detect the plane from the pixel point data 121. The plane detection component 130 can store the current plane data 131 in the plane buffer for subsequent use.

The segmentation component 140 can implement a process to use the updated plane data 133 in order to segment pixels of the image frame which correspond to the object of interest from those of the interaction plane 105. In one implementation, segmentation component 140 can perform an analysis to identify pixels of like image values 115, which collectively can identify the location and shape of the object of interest. As described with an example of FIG. 3, once the pixels which form the interaction plane 105 are approximated, the segmentation component 140 can utilize an energy function to approximate a remainder set of pixels which correspond to the object of interest, based on a pixel comparison of color or chromacity. The segmentation component 140 can produce a foreground image 141, corresponding to the approximation of the object of interest. The foreground image 141 may exclude those pixels which are approximated as belonging to the interaction plane 105, as well as those pixels which have been filtered with the implementation of the filtering component 120 in order to reduce the noise of the respective pixel values (e.g., smooth out noise variations in the depth data of individual pixels).

In some implementations, the foreground image 141 is subjected to one or more object determination processes of object determination component 150 in order to determine shape, location, spatial characteristics (e.g., two-dimensional dimensions and/or depth map for surface of object), object type, or other characteristics of interest. The object type can correspond to the determination as to whether the detected object is an object which should be analyzed or further processed for interpretation. For example, system 100 can be implemented to process hand gestures made over the interaction plane, and the detected object can be deemed to have a shape which is not a user hand, in which case the presence of the object in the interaction plane can be ignored (e.g., such as the case when the object of interest is an object that is inadvertently placed on the interaction plane). Furthermore, system 100 can be implemented in context of applications which interpret three-dimensional movement (e.g., three-dimensional hand gestures), and as such, a history of object data may be needed in order to interpret the three-dimensional action. In one implementation, an object data buffer 165 maintains object information 151. The object information 151 can include (i) object pixel data 153 (e.g., depth information, image value) of the pixels which approximate the object of interest for a given image frame 107, (ii) object characteristics 155, such as shape, spatial characteristics or object type.

In some variations, the object data buffer 165 can also associate confidence values with object pixel data 153 or object characteristics 155. The confidence values can be recorded in a variety of contexts, such as from the image camera 103 in context of its approximation of depth information provided with individual pixels, or by way of approximation in terms of the plane detection and/or segmentation.

The movement interpretation component 160 can utilize buffered object data 161 in order to determine a corresponding input 171 for the system input 170. The buffered object data 161 can correspond to representation of multiple detected instances of object information 151, captured over a duration that includes a gesture or other movement of the object of interest, or portion of a gesture/movement. The movement interpretation component 160 can access rules 162 and other logic in order to interpret the buffered object data 161. By way of example, the rules 162 can be application or context specific, so that gestures or movements of the object of interest can be interpreted differently based on the determined application or context for which the gesture of movement is to apply to.

The system 170 can perform a programmatic action in response to the corresponding input 171. In some implementations, system input 170 can be integrated with the system 100. In variations, system 100 can be implemented as an accessory or external component which communicates with the computer system where system input 170 resides.

In a variation, one or more contact sensors may be combined with the interaction plane 105 in order to determine when the object of interest makes contact with the interaction plane. The contact sensor can include, for example, a capacitive sensor, acoustic sensor, or vibrational sensor. The detection of objects making contact with the interaction plane 105 enables detection of a more diverse and granular range of motions and gestures from a user's hand or other object of interest.

Methodology

Figure 2:
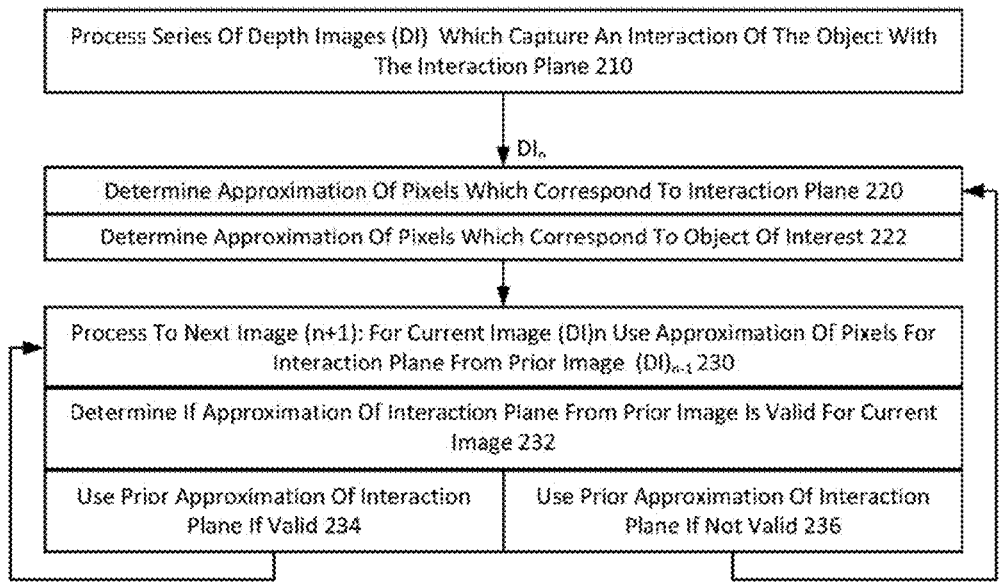
FIG. 2 illustrates an example method for processing a series of images to determine an interaction of an object with an interaction plane.
Figure 3:
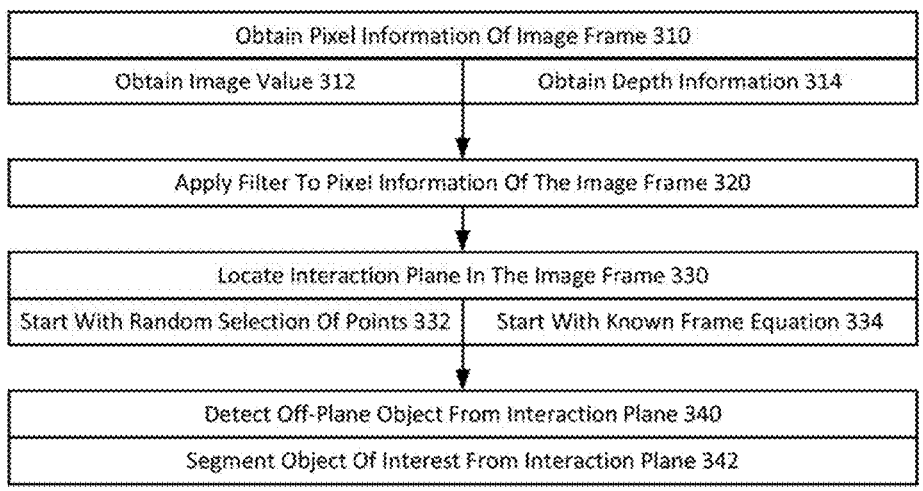
FIG. 3 illustrates an example method for segmenting an image into an interaction plane and an object of interest.

FIG. 2 illustrates an example method for processing a series of images to determine an interaction of an object with an interaction plane. FIG. 3 illustrates an example method for segmenting an image into an interaction plane and an object of interest. In describing an example of FIG. 2 or FIG. 3, reference may be made to elements of FIG. 1 for purpose of illustrating a suitable component or process for performing a step or sub-step being described.

With reference to FIG. 2, a series of depth images (DI) can be processed which capture an interaction of an object and an interaction plane (210). The series of depth images can correspond to a video input which is captured by the depth cameras 103. For example, system 100 can receive a video input from the depth cameras 103 which correspond to a user moving his hand or finger in three-dimensions relative to the interaction plane 105.

For a given depth image ($DI_n$) (e.g., initial or first image of a video capture), system 100 can determine an approximation of pixels which can correspond to the interaction plane (220). The plane detection component 130 can, for example, determine an approximation of pixels which form the interaction plane 105 in the depth image ($DI_n$) in the form of a plane equation. Once the plane approximation of pixels is determined, pixels of the object of interest can be determined (222). The approximation of the pixels corresponding to the object of interest in the depth image ($DI_n$) can be dependent in part on excluding the pixels which approximate the interaction plane 105. In one implementation, the segmentation component 140 uses an energy component to approximate those pixels which correspond to the object of interest. The energy equation can equate pixels to correspond to the object of interest based in part on pixel values such as color or chromacity as well as depth.

Once the given image is processed, a next or follow on depth image ($DI_{n+1}$) can be processed as the current image ($DI_{n+1}=DI_n$), and the approximation of pixels which form the interaction plane from the prior image can be used as a preliminary guess or estimation of the pixels of the interaction plane 105 in the current image ($DI_n$) (230). In some implementations, a determination can be made as to whether the approximation of the interaction plane 105 from the prior depth image ($DI_{n-1}$) is valid for the current depth image ($DI_n$) (232).

If the approximation is valid (234), then the approximation (e.g., plane equation) of the prior depth image ($DI_{n-1}$) can be carried forward and used in the current depth image ($DI_n$). The process can then be repeated for the next depth image at (230). If the approximation is not valid (236), then the process can be repeated at (220), with re-approximation of the pixels which form the interaction plane 105 and the object of interest.

With reference to an example of FIG. 3, the depth camera 103 can capture image frames for a video clip, and each image frame can be processed for pixel information (310). In one implementation, the depth camera 103 corresponds to an RBD (red blue green depth) camera. In variations, the depth camera 103 can correspond to an alternative depth image capture device, such as a stereo-pair (or other combination) of non depth cameras which are combined with image processing to capture depth information. The pixel information can represent image pixels as u=(u; v)T. Each image pixel can include an image value (312) and depth information (314). The depth information for each image pixel u=(u, v)T can be provided by a three-dimensional spatial point x(u)=(x(u, v), y(u, v), z(u, v))T. In one implementation, the image value of each pixel in the RCB color space can be represented as c(u)=(r(u, v), g(u, v), b(u, v))T.

A filter can be implemented to reduce pixel noise from the pixel information (320). In one implementation, a fast filter is applied to smooth a point cloud representation of the image pixels for each image frame. In particular, the point cloud obtained by off-the-shelf RGB-D cameras tend to contain measurement errors, which can be reduced or normalized using a filtering method. The filter can be implemented by, for example, an average (box) filter with an adaptive windows size that is based on distance from the object to the camera.

The pixel information of the image frame can be further analyzed to detect the interaction plane (330). The interaction plane can be determined from a process that starts with either a set of randomly selected pixels (332), or with information previously determined about the interaction plane from a related image frame (e.g., previous image frame of the video clip) (334). In one variation, a temporally coherent version of RANSAC (Random Sample Consensus) algorithm may be used to extract the interaction plane at the start from randomly selected points, so that off-plane objects can be detected. In extracting the interaction plane, an assumption can be made that the interaction plane is visible to the RGB-D camera except when occluded by off-the plane objects (e.g., including the hands). This assumption can be used to model the problem of locating the interaction plane in the image frame as finding the largest plane in a point cloud acquired by the RGB camera 103. Typically, the percentage of points that belong to the plane is high, and application of the RANSAC tends to converge to identify the interaction plane in just a few iterations.

According to one implementation, an interaction plan may be represented by $a^T x=1$, where $a=(a1, a2, a3)^T$ is the normal vector of the plane, and x is a 3D point. Following implementation of the RANSAC process, a set of three points is randomly selected, and the normal vector a of the plane formed by randomly selected points is computed. For all x, the distance $$d(x) = \frac{a^T x}{\|a\|}$$

is computed, and if at least a fraction p (e.g., 20%) of them present a distance smaller than the threshold T (e.g., 1 cm), the plane is recomputed with all these valid points using, for example, a Mean. Least Squares fitting. Otherwise, another set of 3D points is selected, and the method is iterated.

Assuming that the camera is mostly static (so that a is not expected to change drastically in time), the plane equation obtained at a given frame is used as an initial estimate in the next frame, avoiding the initial random selection of points. If the plane equation has not changed (or changed just a small amount), the plane may be re-estimated in a single iteration. The pipeline for estimating the interaction plane is illustrated in FIG. 1. With respect to FIG. 4 C, a detected plane is shown prior to segmentation.

Once the interaction plane is determined, off-plane objects can be detected using a segmentation process (340). When the object of interest is off the interaction plane 105, the interaction plane itself can provide a good estimate of the off-plane object. However, when the off-plane object is very close to or on the interaction plane, there is only a small difference between the depth of the hand and the plane, and this can cause the part of the off-plane object to be misdetected.

In some variations, a segmentation process can be performed to detect the off-plane object apart from the interaction plane (342). For example, the segmentation component 140 can implement a process to determine when the object of interest is on or very close to the interaction plane 105. In one aspect, the segmentation process can be a marker-based watershed procedure that can be implemented to combine depth and pixel value (e.g , color or chromacity information). To obtain a contour or shape of an off-plane object (e.g., the hand), a markers-based watershed transform may be used. The interaction plane can be estimated again using the RANSAC process, but with a lower threshold (0.25 cm in this case), to avoid false positives (i.e. non-planar objects detected as planar). The resulting binary image is then eroded to further separate the interaction plane from the object of interest. An example of the selection of background and foreground markers is illustrated in FIG. 4D. Given the appropriate markers, the next step can correspond to defining the energy function to guide the watersheds. Examples recognize that when the object of interest is sufficiently far from the planar surface, the gradient magnitude of the distance from a point to the plane can be sufficient to capture a contour or shape of the object of interest. However, an energy of the object of interest can become progressively smaller as the object of interest gets closer to the interaction plane, in which case additional color information can be used to capture shape or color of the object of interest.

It should be noticed that in some usage scenarios involving interaction with passive planar surfaces (e.g. a table), the light source is typically above the interaction plane. This arrangement can cast, shadows from the object of interest onto the surface. Examples recognize further that in such cases, pixel values which are based on color can also capture shadows. Accordingly, in some examples, the pixel values that are used include chromaticity information. More precisely, we use the CIE L*a*b color space and the desired chromaticity map is given by $$C(u, v) = \sqrt{a(u,v)^2 + b(u,v)^2}$$

where a and b are the color-opponent dimensions (the lightness L is discarded). Additionally, the proposed energy map E is given by $$E(u, v) = \|\nabla d\| + \beta \frac{\varepsilon^2}{\varepsilon^a + d^a} \|\nabla C\|$$

where d is a distance-to-plane function which controls the influence of the chromaticity term, and controls how close to the plane color information starts to be relevant.

EXAMPLES

Figure 4A:
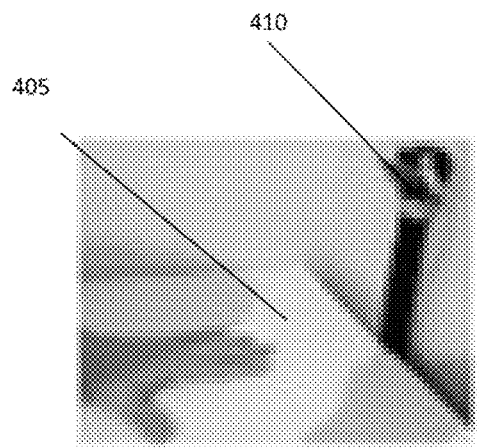
FIG. 4A-4D illustrates an example of a process for recognizing a depth image of a hand placed on an interaction plane.
Figure 4B:
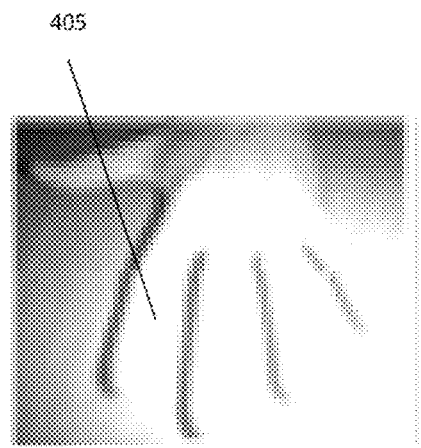
Figure 4C:
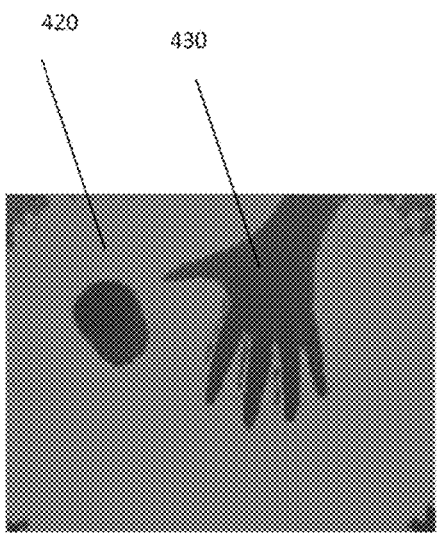
Figure 4D:
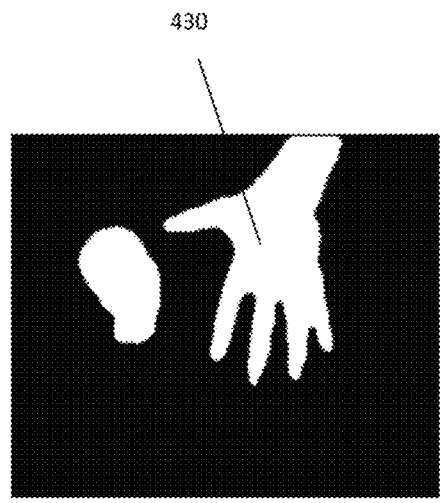

FIG. 4A-4D illustrates an example of a process for recognizing a depth image of a hand placed on an interaction plane. An example of FIG. 4A-4D can be implemented using, for example, system 100 such as described with an example of FIG. 1, or methods such as described with examples of FIG. 2 and FIG. 3. In FIG. 4A, a hand, corresponding to an object of interest, is placed on an interaction plane 405. One or more depth cameras 410 are positioned to capture images (e.g., video, or series of images) from the interaction plane 405.

FIG. 4B illustrates a depth-based image of the hand, as captured by the camera 410 when the hand is placed on the interaction plane 405. In FIG. 4C, the depth-based image is used to (i) determine an plane approximation of pixels 420 which correspond to the interaction plane 405, and (ii) an approximation of pixels 430 which correspond to the hand placed on the interaction plane 405. For example, the plane detection component 130 can determine the plane approximation of pixels 420, as well as the object approximation of pixels 430.

In FIG. 4D, the approximation of pixels 430 which correspond to the hand are extracted from the background of the interaction plane 405. The shape, position and/or proximity of the hand to the interaction plane 405 can be analyzed and correlated to input or other data. The characteristics of the hand can be determined from the object approximation of pixels 430 as determined from either the individual image, or for a series of images in which the hand is moved or gestured over or on the interaction plane 405.

Figure 5:
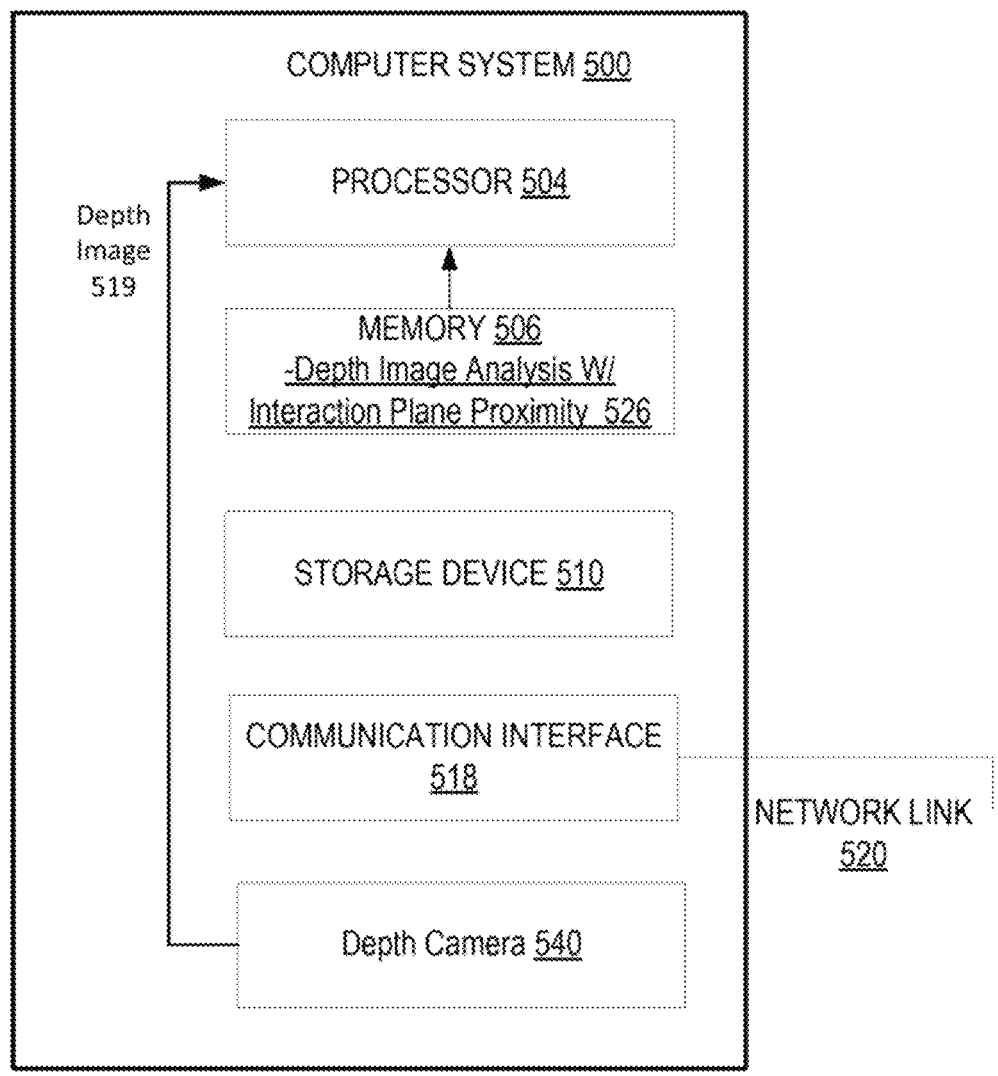
FIG. 5 illustrates an example computer system for implementing one or more examples.

FIG. 5 illustrates an example computer system for implementing one or more examples. In particular, an example computer 500 can be used to implement the depth image processing system 100 such as described with an example of FIG. 1, or example methods such as described with FIG. 2 or FIG. 3. The computer system 500 includes at least one processor 504 for processing instructions. Computer system 500 also includes a memory 506, such as a random access memory (RAM) or other dynamic storage device, for storing information and instructions to be executed by processor 504. The memory 506 can include a persistent storage device 510, such as a magnetic disk or optical disk. The memory 506 can also include read-only-memory (ROM). A communication interface 518 enables the computer system 500 to communicate with other computers or data processing components or individual wireless devices using, for example, a wireless GSM network or Public Switch Telephony Network (PSTN), over network link 520. As an alternative or addition, the communication interface 518 enables the computer system 500 to communicate with other services, such as administrative services or with servers of other service providers.

In an example of FIG. 5, the computer system 500 also includes a depth camera 540 to capture depth images 519. As described with some other examples, the depth camera 540 can be oriented or directed towards an interaction plane (not shown in FIG. 5) in order to capture a movement or gesture of an object with respect to or over the interaction plane 105. In an example of FIG. 5, the memory stores instructions 526 for processing depth images which detect object interactions with respect to or over an interaction plane. The instructions 526 can be executed by the processor 504 in order to analyze depth images 519 captured by the depth camera 540.

In an example of FIG. 5, the processor 504 executes one or more sequences of instructions stored in memory 506. Such instructions may be read into memory 506 from another machine-readable medium, such as a storage device. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and the equivalents. Furthermore, it is contemplated that a particular feature described, either individually or as part of an embodiment, can be combined with other individually described features, or parts of other embodiments Thus, absence of describing combinations should not preclude the inventor(s) from claiming rights to such combinations.

What is claimed is:

1. A non-transitory computer readable medium comprising instructions that when executed cause a computing device to:

process a series of depth images from a depth camera and that capture an interaction of an object with respect to an interaction plane that corresponds to an interaction surface for the computing device;

determine, for an initial image of the series, a plane approximation of pixels that correspond to the interaction plane, and an object approximation of pixels that correspond to the object, the plane and object approximations of pixels for the initial image being determined from depth information carried by individual pixels of the initial image;

determine, in one or more images that follow the initial image, an object approximation of pixels that correspond to the object, based on the plane approximation of pixels that corresponds to the interaction plane as determined for the initial image; and provide an input to a process executed in the computing device based on the object approximation of pixels determined in the one or more images that follow the initial image.

2. The non-transitory computer readable medium of claim 1, wherein determining the plane approximation of pixels or the object approximation of pixels for the initial image includes determining the plane approximation of pixels or the object approximation of pixels using color information associated with individual pixels of the initial image.

3. The non-transitory computer readable medium of claim 1, wherein determining the object approximation of pixels for the initial image includes determining the object approximation of pixels using color information associated with individual pixels of each of the one or more images that follow the initial image.

4. The non-transitory computer readable medium of claim 1, further comprising instructions that when executed cause the computing device to:
filter the initial image or each of the one or more images that follow the initial image, in order to filter out a select set of pixels that are deemed noisy.

5. The non-transitory computer readable medium of claim 1, wherein determining the plane approximation of pixels or the object approximation of pixels for the initial image comprises determining the plane approximation of pixels or the object approximation of pixels using an energy equation that utilizes at least one of color or depth information.

6. The non-transitory computer readable medium of claim 1, wherein the series of depth images is captured using a red green blue depth (RGB-D) camera.

7. The non-transitory computer readable medium of claim 1, further comprising instructions that when executed cause the computing device to:
interpret the interaction as input for the computing device based on determining information about at least one of a shape or proximity of the object relative to the interaction plane.

8. The non-transitory computer readable medium of claim 7, further comprising instructions that when executed cause the computing device to segment, in each of the initial image and the one or more images that follow the initial image, the object from the interaction plane using the object approximation of pixels for the one or more images that follow the initial image.

9. The non-transitory computer readable medium of claim 1, further comprising instructions which when executed cause the computing device to:
for a second image that follows the initial image in time, determine whether the plane approximation of pixels for the interaction plane is accurate based on depth information carried by individual pixels of the second image,
wherein determining whether the plane approximation of pixels is accurate is performed for the second image in response to determining that the plane approximation of pixels for the interaction plane is valid for the second image.

10. The non-transitory computer readable medium of claim 9, wherein when the plane approximation of the interaction plane is determined to not be valid, then the instructions when executed cause the computing device to:
determine, for either the second image or a subsequent image, a plane approximation of pixels that corresponds to the interaction plane.

11. The non-transitory computer readable medium of claim 9, wherein determining whether the plane approximation of pixels is accurate is based on color values of individual pixels of the second image.

12. The non-transitory computer readable medium of claim 1, wherein the series of depth images are from a plurality of depth cameras.

13. The non-transitory computer readable medium of claim 1, wherein the interaction comprises a gesture input of the object on the interaction surface.

14. The non-transitory computer readable medium of claim 1, wherein the process comprises a process of a program executed in the computing device, and the input based on the object approximation of pixels determined in the one or more images that follow the initial image controls the program.

15. A computer system comprising:
a processor;
a camera to capture depth images from an interaction plane that corresponds to an interaction surface for the computing system;
a non-transitory storage medium storing instructions executable on the processor to:
process a series of the depth images that capture an interaction of an object with respect to the interaction plane;
determine, for an initial image of the series, a plane approximation of pixels that correspond to the interaction plane, and an object approximation of pixels that correspond to the object, the plane and object approximations of pixels for the initial image being determined from depth information carried by individual pixels of the initial image;
determine, in one or more images which that follow the initial image, an object approximation of pixels that correspond to the object, based on the plane approximation of pixels that corresponds to the interaction plane as determined for the initial image; and
provide an input to a process executed in the computing system based on the object approximation of pixels determined in the one or more images that follow the initial image.

16. The computer system of claim 15, wherein the camera comprises a red-green-blue (RGB) depth camera.

17. The computer system of claim 15, further comprising an input interface to process information about the object interacting with the interaction plane based on the object approximation of pixels from at least one of the initial image or the one or more images that follow the initial image.

18. The computer system of claim 15, comprising a plurality of cameras including the camera, wherein the plurality of cameras are to capture the depth images.

19. A method comprising:
processing, by a computing device, a series of depth images from a depth camera and that capture an interaction of an object with respect to an interaction plane that corresponds to an interaction surface for the computing device;
determining, by the computing device for an initial image of the series, a plane approximation of pixels that correspond to the interaction plane, and an object approximation of pixels that correspond to the object, the plane and object approximations of pixels for the initial image being determined from depth information carried by individual pixels of the initial image;
(c) determining, by the computing device in one or more images that follow the initial image, an object approximation of pixels that correspond to the object, based on the plane approximation of pixels that corresponds to the interaction plane as determined for the initial image; and
providing, in the computing device, an input to a process executed in the computing device based on the object approximation of pixels determined in the one or more images that follow the initial image.

20. The method of claim 19, wherein determining the plane approximation of pixels and the object approximation of pixels for the initial image comprises determining the plane approximation of pixels and the object approximation of pixels using an energy equation that utilizes at least one of color or depth information.

* * * * *

UNITED STATES PATENT AND TRADEMARK OFFICE
CERTIFICATE OF CORRECTION

PATENT NO. : 10,269,136 B2  
APPLICATION NO. : 15/542882  
DATED : April 23, 2019  
INVENTOR(S) : Daniel George Gelb et al.

Page 1 of 1

It is certified that error appears in the above-identified patent and that said Letters Patent is hereby corrected as shown below:

In the Claims

In Column 12, Line 56, Claim 19, before "determining," delete "(c)".

Signed and Sealed this  
Twenty-eighth Day of April, 2020

Andrei Iancu  
*Director of the United States Patent and Trademark Office*